UNITED STATES PATENT OFFICE.

HARRY J. LEWIS AND SAMUEL L. BELLMAN, OF PITTSBURG, PENNSYLVANIA.

WRITING FLUID AND PROCESS OF MAKING SAME.

SPECIFICATION forming part of Letters Patent No. 574,437, dated January 5, 1897.

Application filed March 18, 1896. Serial No. 583,742. (No specimens.)

*To all whom it may concern:*

Be it known that we, HARRY J. LEWIS and SAMUEL L. BELLMAN, citizens of the United States, residing at Pittsburg, in the county of Allegheny and State of Pennsylvania, have invented certain new and useful Improvements in Writing Fluids and Processes of Making the Same; and we do declare the following to be a full, clear, and exact description of the invention, such as will enable others skilled in the art to which it appertains to make and use the same.

The object of this invention is to provide an ink or writing fluid which is particularly adapted for writing on blue-print paper subsequently to its exposure in the art of making blue prints and making thereon distinct sharply-defined white lines.

We have discovered that when solid acid oxalate of an alkali or an acid alkaline oxalate is mixed with a solid neutral alkaline carbonate in such proportions that there shall be no excess of the neutral alkaline carbonate over that required to convert the said acid oxalate into a neutral salt and the mixture is dissolved in water there is formed a solution of oxalate and bicarbonate of the alkali, neutral to test-paper, which constitutes a superior liquid or ink adapted for writing on blue-print paper subsequently to its exposure in the well-known process of making blue prints. This ink produces on such blue-print paper a distinct sharply-defined white line which is never ragged or frayed at the edges, as is always the case when other materials, such as an alkaline solution, is used, and will stand wetting without destroying or changing the lines.

In order to enable those skilled in the art to manufacture this ink, we will proceed to describe the method that we have found best adapted to produce it, though we do not wish to be limited to the proportions named nor to the alkaline salts.

We mix together in a porcelain or any other suitable vessel binoxalate of potassium, commonly known as "salt of sorrel," and carbonate of potassium, commonly called "pearlash," or the refined carbonate of potassium in the proportions of about three parts, by weight, of the binoxalate of potassium to about two parts of potassium carbonate and dissolve the same at the ordinary temperature in a sufficient quantity of water to make a solution, which shall be as nearly as possible half saturated, and then filter the same. The addition of water produces effervesence, owing to the liberation of carbonic-acid gas, but after filtering out the insoluble oxalates mixed with some bicarbonate of potassium, produced by the greater insolubility of this salt over the neutral carbonate and any insoluble oxalates resulting from impurities in the materials used, the mixture must be strictly neutral to test-paper. This neutrality we believe to be due to some alkaline bicarbonate formed through the dissolving process and passing into solution along with the resulting neutral oxalate. This excess of carbonate of potassium is not injurious so long as sufficient carbonic acid is liberated during the process of solution to convert that excess into bicarbonate of an alkali, but should an excess above this be added the liquid will be alkaline to test-papers and is not adapted for the purpose named.

We are aware that oxalic acid and acid oxalates have been used to dissolve various ferrocyanogen compounds, and we are also aware that solutions of caustic alkalies and alkaline carbonates have been used for the same purpose. Therefore we do not claim such substances; but What we do claim, and desire to secure by Letters Patent, is—

1. The process of manufacturing ink or fluid for writing on blue prints, which consists in mixing a solid acid oxalate of an alkali with solid neutral carbonate of an alkali in excess over that required to neutralize the acid oxalate, dissolving the same in water and forming thereby a liquid with strictly neutral reaction toward test-papers which is composed of a neutral alkaline oxalate of an alkali and an acid carbonate of an alkali, substantially and in the manner described.

2. In the process of manufacture of ink for writing on blue prints the production of a liquid with a reaction strictly neutral to test-papers by dissolving in water a mixture of an acid alkaline oxalate of an alkali and an excess of a neutral carbonate of an alkali in such a way that the strictly neutral reaction to test-paper is due to the formation of a neutral oxalate of an alkali and an acid carbonate of an alkali, substantially in the manner described.

3. An ink or fluid, adapted for writing on blue prints, consisting of a liquid having a neutral reaction toward test-paper and composed of a neutral oxalate of an alkali and an acid carbonate of an alkali in water.

In witness whereof we affix our signatures in presence of two witnesses.

HARRY J. LEWIS.
SAMUEL L. BELLMAN.

Witnesses:
TULA NASER,
A. H. LESLIE.